_United States Patent_ [19]

Mui

[11] Patent Number: 5,425,058
[45] Date of Patent: Jun. 13, 1995

[54] MSK PHASE ACQUISITION AND TRACKING METHOD

[75] Inventor: Shou Y. Mui, Cherry Hill, N.J.

[73] Assignee: Martin Marietta Corporation, Camden, N.J.

[21] Appl. No.: 98,590

[22] Filed: Jul. 28, 1993

[51] Int. Cl.[6] ........................ H03D 3/00; H04L 27/14
[52] U.S. Cl. .................... 375/336; 375/274; 375/305; 329/300
[58] Field of Search ...................... 375/47, 96, 64, 118, 375/90, 80; 329/300; 332/100

[56] References Cited

U.S. PATENT DOCUMENTS

| | | | |
|---|---|---|---|
| 4,518,996 | 5/1985 | Reitmeier et al. | 358/148 |
| 4,583,048 | 4/1986 | Gumacos et al. | 329/122 |
| 4,635,279 | 1/1987 | Nossen | 375/78 |
| 4,694,467 | 9/1987 | Mui | 375/1 |
| 5,144,256 | 9/1992 | Lim | 375/80 |
| 5,170,415 | 12/1992 | Yoshida et al. | 375/80 |
| 5,195,108 | 3/1993 | Baum et al. | 375/80 |

Primary Examiner—Stephen Chin
Assistant Examiner—T. Ghebretinsae
Attorney, Agent, or Firm—W. H. Meise; G. H. Krauss; S. A. Young

[57] ABSTRACT

An MSK receiver includes a downconverter for downconverting the received MSK signals. The phase drift or phase error per bit of the message preamble is determined. The reference carriers are generated, and the phase of the reference signals is adjusted during message demodulation under the control of the estimated rate of phase change across the preamble portion. In accordance with another aspect of the invention, the downconverted MSK signal burst is digitized and the digitized burst signal is stored in memory, following which it is read repeatedly so that bit timing, start-of-message timing, carrier phase, and carrier drift processing may be performed in a desired sequence, using all the available information for more accurate demodulation. According to a yet further aspect of the invention, a second order tracking loop is used to adjust the phase of the demodulation reference signals.

12 Claims, 2 Drawing Sheets

MSK PHASE ACQUISITION AND TRACKING METHOD

The Government has rights in this invention pursuant to contract F19628-91-C-0028 with the Department of the Air Force.

FIELD OF THE INVENTION

This invention relates to an arrangement for reducing the lock-up time and improving the noise performance in a receiver for burst minimum-shift-keyed communications.

BACKGROUND OF THE INVENTION

Minimum-shift keying (MSK) is a form of frequency-shift keying with frequency separation equal to one-half the bit rate. MSK provides spectrally efficient modulation in terms of bits-per-second per hertz (Hz) of bandwidth. Prior-art MSK processors are described in U.S. Pat. No. 4,583,048, issued Apr. 15, 1986 in the name of Gumacos et al., and in U.S. Pat. No. 4,635,279, issued Jan. 6, 1987 in the name of Nossen, both of which are hereby incorporated by reference.

MSK signals are demodulated by concurrent use of in-phase (I) and quadrature (Q) demodulators, each of which includes the multiplier. Sinusoidal and co-sinusoidal reference or demodulating signals are applied to the Q and I multipliers, respectively, at a frequency which is ideally equal to that of the carrier frequency of the MSK signal. Asynchronous demodulation can be accomplished with reference signals which are at the same frequency as the MSK carrier, but which are not necessarily in the same phase. This type of asynchronous demodulation results in an increase in noise by comparison with synchronous demodulation, in which the sinusoidal reference signal is in both frequency and phase synchronism with a carrier component of the modulated MSK signal. Increased noise results in increased error rate, and is therefore undesirable.

The MSK signal to be received may be downconverted to baseband in preparation for demodulation. The downconversion is performed by mixing or multiplying a local oscillator signal with the MSK-modulated carrier. If the local oscillator signal is not phase coherent with the MSK carrier, the baseband signal carrier will include a phase drift or phase error. This phase error results in increased noise in the demodulated signal and increases the bit error rate (BER).

SUMMARY OF THE INVENTION

An MSK receiver includes a downconverter for downconverting the received MSK signals. The phase drift or phase error per bit of the message preamble is determined. The reference carriers are generated, and the phase of the reference signals is adjusted during message demodulation under the control of the rate of phase change per bit across the preamble portion. In accordance with another aspect of the invention, the downconverted MSK signal burst is digitized and the digitized burst signal is stored in memory, following which it is read repeatedly so that bit timing, start-of-message timing, carrier phase, and carrier drift processing may be performed in a desired sequence, using all the available information for more accurate demodulation. According to a yet further aspect of the invention, a second order tracking loop produces the demodulation reference signals. In one embodiment, this is accomplished determining the difference between the estimated signal phases of the two bits preceding the current bit, and subtracting from the difference the estimated phase change per bit.

DESCRIPTION OF THE INVENTION

Figure 1:
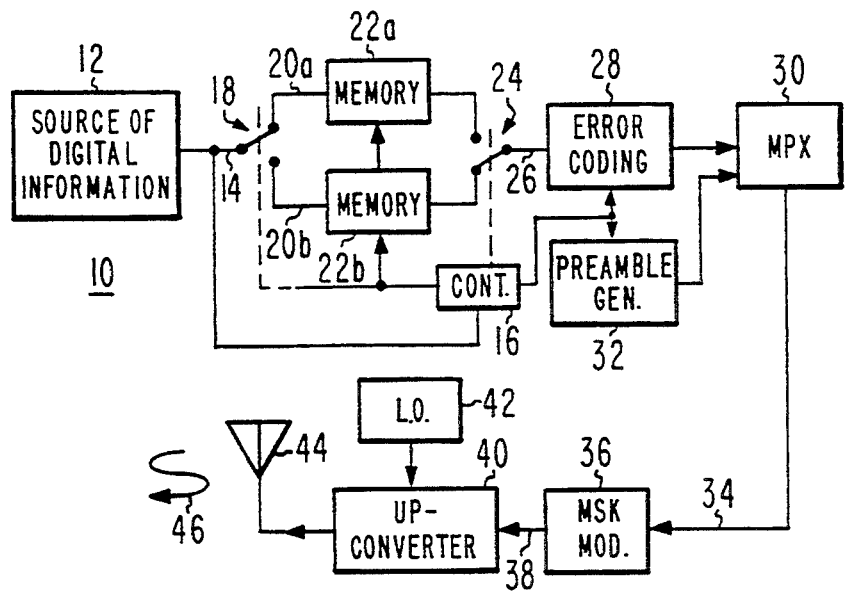
FIG. 1 is a simplified block diagram illustrating an MSK modulator for transmitting MSK-modulated signals including a burst of information together with a preamble.

FIG. 1 illustrates a transmitter designated generally as 10 including a source of digital information 12, which applies the information over a data path 14 to a control apparatus illustrated as a block 16, and to the common element of a single-pole, double-throw switch 18 illustrated by mechanical switch symbol. Those skilled in the art know that such a symbol is conventional, but that solid-state switches are used instead of mechanical switches. Switch 18 alternates positions, under the control of controller 16, to connect source 12 by way of a data path 20a to a memory 22a in the illustrated position of the switch, and in the other position (not illustrated) by way of data path 20b to a memory 22b. In operation, source 12 produces a stream of digital information which is controlled, in conjunction with controller 16, so that sequential bursts of information are applied alternately to memories 22a and 22b for storage. A further single-pole, double-throw switch 24 is also controlled by controller 16, and couples the outputs of memories of 22a and 22b by way of a data path 26 to an error coding block illustrated as 28. Switch 24 is controlled in conjunction with switch 18 so that the memories 22a and 22b are written into and read alternately, in a fashion known as "ping-pong".

In the illustrated position of switch 24, memory 22b is being read under control of controller 16, and the burst of data information stored therein is applied to error coding block 28, which encodes the data and applies it to a time-division multiplex (MPX) block 30. Controller 16 also controls a preamble generator 32 which generates a predetermined preamble in association with each burst of information data. Multiplex block 30 combines the preamble and coded information data, and applies the multiplexed signals over a data path 34 to an MSK modulator 36. MSK modulator 36 modulates the signals onto a carrier. The modulated MSK signals, including MSK symbols representative of the preamble and information data, are applied over a path 38 to an upconverter 40, which upconverts the frequency of the modulated signal to a frequency established by the frequency of local oscillator 42. The upconverted signal is applied from upconverter 40 to an antenna 44, which transmits the signal, as suggested by an arrow 46.

Figure 2:
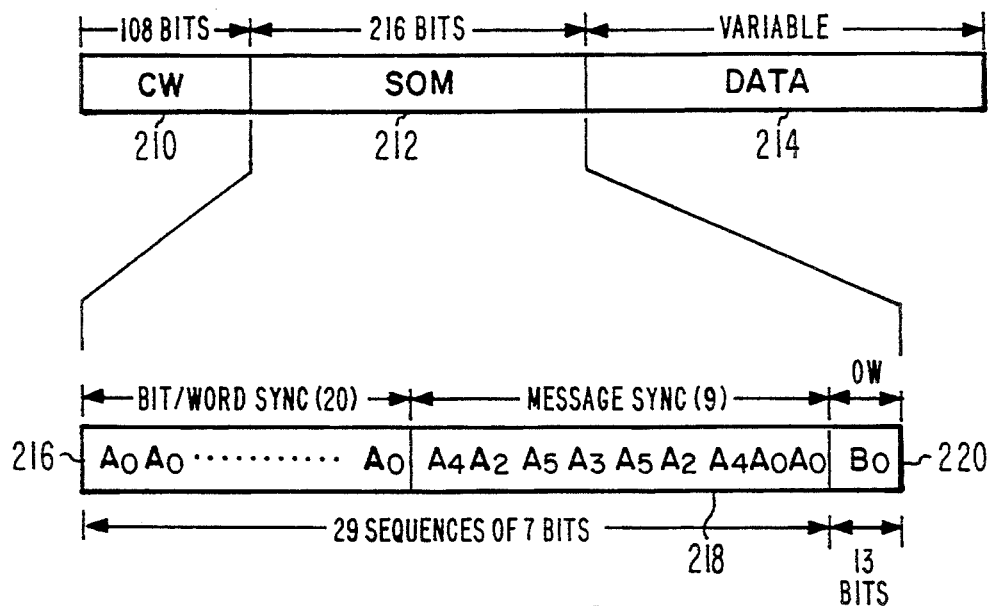
FIG. 2 illustrates details of the arrangement of the preamble in accordance with an aspect of the invention.

FIG. 2 illustrates the relationship of the preamble to the information data at the output of MSK modulator 36 of FIG. 1 in a particular embodiment of the invention. In FIG. 2, a first portion of the preamble is a continuous-wave (CW) portion 210 having a duration equal to 108 bits. Following CW portion 210, a start-of-message (SOM) portion 212 has a duration of 216 bits. Following SOM 212, the information data portion 214 has a length which may be fixed or variable as the information burst length may require. As also illustrated in FIG. 2, start-of-message portion 212 includes a bit/-word sync portion 216 having a duration of 20 words, followed by a message sync portion 218 having a duration of 9 words. As illustrated in FIG. 2, the start-of-message portion also includes an order wire (OW) portion 220, which is not particularly related to the invention, and which may be considered to be a portion of the information signal. Each word of bit/word sync portion 216 and message sync portion 218 of the preamble has seven bits, so that the bit/word sync portion and message sync portion together represent 29 words, each of which is a sequence of 7 bits, for a total of 203 bits. Each of the 20 words of bit/word sync portion 216 of the preamble of FIG. 2 is the same word, designated $A_o$. Preferably, the bits of each of the words of bit/word sync portion 216 are selected for low autocorrelation as, for example, by use of a Barker sequence. In the case of 7 bits per word, a 7-bit Barker sequence $A_o = 111$-$1$-$11$-$1$ may be used. The words of the message sync portion 218 are selected from among cyclic shifts of the 7-bit Barker sequence $A_4, A_2, A_5, A_3, A_5, A_2, A_4, A_0, A_0$, where $A_i$ is $A_0$ cyclically shifted to the left by i bits. For example, $A_2$ equals 1-1-11-111.

Figure 3:
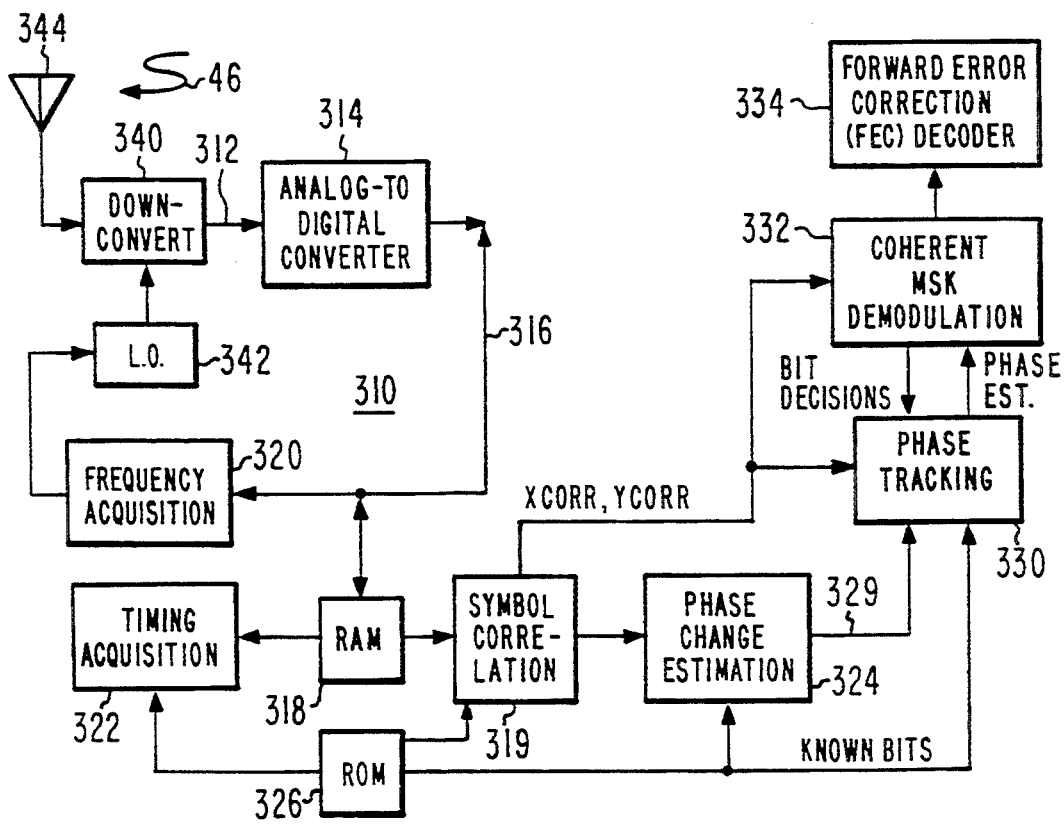
FIG. 3 is a simplified block diagram of a receiver according to the invention.

FIG. 3 is a simplified block diagram, designated as 310, of a receiver in accordance with the invention. In FIG. 3, transmitted signals 46 are received by an antenna 344. The received signals can be represented as $$r(t) = \sqrt{S}\, A_I(t) \cos\left(\frac{\pi t}{2T}\right)\sqrt{2}\, \cos(2\pi f_c t + \theta) + \quad (1)$$

$$\sqrt{S}\, A_Q(t) \sin\left(\frac{\pi t}{2T}\right)\sqrt{2}\, \sin(2\pi f_c t + \theta) + n(t)$$

where T is the channel bit duration, $f_c$ is the carrier frequency, $\theta$ is the unknown signal phase, $A_I(t)$ and $A_Q(t)$ are the even and odd transmitted bit sequences, respectively. The parameter S is the signal power given by $S = RE_b/T$, where R is the FEC code rate and $E_b$ is the energy per data bit. The quantity n(t) is the received noise process, which is usually modelled as an additive white Gaussian noise (AWGN) with single-sided spectral density $N_O$.

The received signals are applied to a downconverter 340, which receives in-phase (I) and quadrature (Q) components of local oscillator signals from a local oscillator 342. Since local oscillator 342 is different from local oscillator 42 of FIG. 1, is in a different environment, and is supplied with energizing voltage from a different source, its frequency will, in general, be different from the frequency of local oscillator 42. The downconverted signal produced on signal path 312 by downconverter 340, therefore, causes the MSK carrier to include a phase drift or phase error component.

More specifically, the downconverter generates the in-phase baseband analog signals, represented as $$x(t) = LPF[r(t)\sqrt{2}\, \cos 2\pi(f_c - \Delta f)t] \quad (2)$$

-continued $$= \sqrt{S}\, A_I(t) \cos\left(\frac{\pi t}{2T}\right)\cos(2\pi \Delta f t + \theta) +$$

$$\sqrt{S}\, A_Q(t) \sin\left(\frac{\pi t}{2T}\right)\sin(2\pi \Delta f t + \theta) + \text{noise}$$

and the quadrature baseband analog signals, represented as $$y(t) = LPF[-r(t)\sqrt{2}\, \sin 2\pi(f_c - \Delta f)t] \quad (3)$$

$$= \sqrt{S}\, A_I(t) \cos\left(\frac{\pi t}{2T}\right)\sin(2\pi \Delta f t + \theta) -$$

$$\sqrt{S}\, A_Q(t) \sin\left(\frac{\pi t}{2T}\right)\cos(2\pi \Delta f t + \theta) + \text{noise}$$

where $\Delta f$ is the error in estimating the carrier frequency, and LPF denotes low-pass filtering, which removes high-frequency terms or components.

In FIG. 3, the downconverted x(t) and y(t) burst signals are applied from data path 312 to an analog-to-digital converter (ADC) 314, which samples the incoming signal, and produces digital signal samples at a rate of at least two, and preferably four or more, digital samples per bit of the incoming signal. Four samples per bit corresponds to eight samples per MSK symbol.

The sampled, digitized signal is applied from ADC 314 over a data path 316 to a memory (RAM) 318 in which the entire burst signal, including the start-of-message portion of the preamble and the information data, are stored. The CW portion of the preamble is applied directly to a frequency acquisition apparatus illustrated as 320, which adjusts the frequency of local oscillator 342 toward the frequency of the received carrier. RAM 318 and frequency acquisition block 320 are part of a preamble processing arrangement 328.

In general, the frequency of local oscillator 342 cannot be adjusted to be identical to the frequency of the received signal. As a result, the effective phase of the MSK carrier will include a phase progression component. The information stored in memory 318 of FIG. 3 includes the effect of this time-varying phase error.

A timing acquisition block 322 is coupled to RAM 318 and to a ROM memory 326 in FIG. 3. ROM 326 is preloaded with information equivalent to a replica of start-of-message portion 212 of the preamble of FIG. 2, including all twenty-nine sequences of seven bits each of the bit/word sync portion 216 and message sync portion 218. Bit/word timing block 322 compares the bit/word sync portion of the received message from RAM memory 318, as described below, with the stored information from ROM memory 326. The resulting bit and word timing information is then made available to a phase change estimation block illustrated as 324, in which stored copies of the received information from RAM 318 are further compared with stored replicas of the preamble from ROM 326, to determine or form an estimate of (a) the phase of the MSK carrier at the beginning of the start-of-message portion of the received signal, and (b) the phase change per bit across the preamble of the message, or more particularly across the bit/word sync and the message sync portions of the preamble. The resulting phase information is applied over a data path 329 to a phase tracking block 330, which combines the beginning-of-SOM phase with the phase-change-per-bit information to produce a demodulation carrier. The demodulation carrier is applied to a coherent MSK demodulator 332 together with stored data. Bit decisions are made in demodulator 332, which are applied back to phase tracking block 330 to allow data direction of the MSK carrier phase. The results of demodulation are also applied to a decoder block 334 for further processing.

While FIG. 3 illustrates discrete processor blocks such as 322, 324 and 330, these blocks and others may be incorporated into a single software-controlled processor in known manner.

Block 322 of FIG. 3 evaluates bit and word timing by repeatedly correlating the stored I and Q samples of the received signal with a replica of one of the 20 identical words of the bit/word synchronization portion of the SOM provided by ROM memory 326. The correlation window is advanced in a positive or negative direction by a time period corresponding to one sample interval. At four samples per bit, and with 7 bits in each of the 20 words of the bit/word sync portion of the preamble, a total of 28 correlations are performed for each word. Each of the 28 correlations of one word is added to the corresponding correlation of the next word. This process of computing 28 correlations and adding to the accumulated correlations continues until a correlation peak can clearly be identified. The largest correlation peak indicates the correct bit and word timing to within one sample interval. While bit and word timing are established by the above-described correlation, the starting time of the SOM is not yet established.

Once the correct bit/word timing relationship between the preamble information in ROM 326 and the received preamble stored in RAM 318 is known, the starting time of the message synchronization portion 218 of FIG. 2 can be established. This is accomplished by correlating the stored received message synchronization signal with the stored replica of the message synchronization signal in ROM 326. Since bit/word timing has already been established, the correlations for message sync detection are performed at each word boundary, and the correlation window is advanced by one word at a time. The message sync portion of the SOM has nine words, each of seven bits. A message sync correlation is the sum of nine correlations, each seven bits long. The largest value of the message synch correlation peaks identifies the timing of the message synchronization portion.

The duration of the word/sync portion of the start-of-message is known, so the time of the beginning of the bit/word synchronization portion is determined, to within one sample interval, by subtracting the known duration of the bit/word synchronization portion from the previously determined starting time of the message sync portion of the start-of-message portion of the preamble.

When the bit, word and message timing has been determined, as described above, in block 322 of FIG. 3, the MSK symbol phase acquisition process may begin. According to an aspect of the invention, phase acquisition and tracking are initiated in block 324 of FIG. 3 by, in general, estimating the phase change per bit $\Delta_b$, the signal phase $\theta$, and applying $\Delta_b$ to aid in tracking the signal phase during the SOM portion 212 and the information data portion 214 of the burst communication.

As mentioned above, when the error in estimating the MSK carrier frequency is non-zero, the signal phase drifts. One frequency synchronization technique gives a frequency error of 0.01/T, where T is the duration of one received bit, at 4 dB signal-to-noise, corresponding to 3.6°/bit.

The correlations are performed in symbol correlation block 319. An in-phase symbol correlation XCORR evaluated at sampling time j is defined as $$XCORR(j) = \sum_{i=0}^{7} x_{j-4+i} S_i \qquad (4)$$

where $x_i$ is the value of x(t) at the $i^{th}$ sampling time instant, the factor "4" causes the summation to take place at a corresponding sampling time in each bit, and $S_i$ is the amplitude of the MSK pulse:

$$S_i = \sin(i\, \pi/8 + \pi/16) \qquad (5)$$

Similarly, the quadrature symbol correlation YCORR(i) is defined as $$YCORR(j) = \sum_{i=0}^{7} y_{j-4+i} S_i \qquad (6)$$

These correlations are performed by correlating the stored I and Q samples with a template $S_i$ of an MSK symbol stored in ROM 326. As in the correlations described above, the correlation window is advanced at each repetition, but by one bit of the preamble, rather than by one sample interval. This produces N pairs of XCORR and YCORR values, where N is the number of bits in the start-of-message portion 212 and the data portion 214 of FIG. 2. These values are stored in symbol correlation block 319 for use by the phase change estimation block 324, the phase tracking block 330 and the coherent MSK demodulation block 332.

The symbol correlations for the SOM portion of the preamble are combined coherently over the duration of the 7-bit sequences to form word correlations. The word correlation portion is performed by the phase change estimation block 324. Consider the bit sequence 111-1-11-1 of word A0 of FIG. 2. The in-phase and quadrature channel bit sequences are $A_I=11$-1-1 and $A_Q=1$-11. The sequence of seven transmitted MSK symbols has the polarities: $++-+-++$, and is represented as P(0)=11-11-111. The polarity representations P(M) for sequences AM, M=2, 3, 4 and 5 can be determined similarly. Note that $A_1$ and $A_6$ are not used in the SOM. Suppose the word correlation begins at sample k and is for sequence M. Block 324 of FIG. 3 determines $Z_C$ and $Z_S$, the unadjusted in-phase and quadrature word correlations, respectively, for each word of the start-of-message portion of the preamble:

$$Z_c = \sum_{j=0,2,4,6} XCORR(k+8j)\, P(M,j) - \qquad (7)$$

$$\sum_{j=1,3,5} YCORR(k+8j-4)\, P(M,j)$$

and $$Z_s = \sum_{j=0,2,4,6} YCORR(k+8j)\, P(M,j) + \qquad (8)$$

-continued $$\sum_{j=1,3,5} XCORR(k + 8j - 4) P(M,j)$$

where P(M, j) is the jth component of P(M), the factor 8 is the number of samples per MSK symbol.

Equation (7) represents the sum of products of XCORR multiplied by the MSK symbol pulse polarity for the four even-numbered bits within each word, from which is subtracted the product of YCORR multiplied by the MSK symbol polarity for the three odd-numbered bits in the word. The first bit of each word is numbered zero.

The in-phase and quadrature word correlations $R_c$ and $R_s$, respectively, which are proportional to the cos $\theta$ and sin $\theta$ terms, respectively, where $\theta$ is the signal phase to be estimated, are related to $Z_c$ and $Z_s$. For the bit sequence corresponding to the first word of bit word sync portion 216 (i.e. for sequence 0), $R_c = Z_s$ and $R_s = Z_s$. For the sequence of bits corresponding to the second word of bit/word sync portion 210 (i.e. for sequence 1), the roles of $A_I$ and $A_Q$ are reversed, and $R_c = Z_s$ and $R_s = -Z_c$, where the minus sign accounts for the phase shift of $\pi$ radians at the end of sequence 0 as a result of the MSK carrier having gone through a phase shift equal to an odd integer multiple of $\pi$ radians. Similarly, for each of the bit sequences of the 29 words in the start-of-message portion 212 of the preamble, the values of $R_c$ and $R_s$ are listed in TABLE 1, where M4 is the number of bits counted modulo 4 from the beginning of the preamble to the beginning of the word, not counting the bits in the current word.

TABLE 1

| SEQUENCE | M4 | $R_c$ | $R_s$ |
|---|---|---|---|
| 0,4,8, ... 24,28 | 0 | $Z_c$ | $Z_s$ |
| 1,5,9, ... 25 | 3 | $Z_s$ | $-Z_c$ |
| 2,6,10, ... 26 | 2 | $-Z_c$ | $-Z_s$ |
| 3,7,11, ... 27 | 1 | $-Z_s$ | $Z_c$ |

The phase drift per bit $\Delta_b$ is estimated by determining the phase of each 7-bit Barker sequence of a word, taking the difference of the phase estimates of the bit sequences of adjacent words, and averaging all the estimated phase differences. The estimate of the phase of a 7-bit Barker sequence is defined as the estimate of the phase 8 of the middle bit (the fourth bit) of the sequence, $$\hat{\theta} = \tan^{-1}(R_s/R_c) \quad (9)$$

where $\hat{\theta}$ can range from $+\pi$ to $\pi$ by taking into account the signs of $R_c$ and $R_s$.

The rate of change of phase per seven-bit word is $$\Delta_s = \frac{1}{27} \sum_{i=1}^{27} (\hat{\theta}_i - \hat{\theta}_{i-1}) \quad (10)$$

where $\hat{\theta}_i$ is the estimated phase of word i, where i=0 for the first word of the SOM. As explained below, word 28 is not used in estimating the phase change.

Estimated rate of change of phase As is unbiased, i.e., not subject to a bias due to the effects of the polarities of adjacent bits. Other choices of start-of-message sequences may result in a bias requiring correction. The word 28 is not used since it would introduce a bias in the phase change estimate.

Since there are seven bits per sequence, the rate of phase change per bit is $$\Delta_b = \Delta_S/7 \quad (11)$$

Computer simulations have shown that $\Delta_b$ can be estimated with an accuracy of about 0.1° for $\Delta f = 0.02/T$ and $E_b/N_0 = 4$ dB. Estimating the rate of change of phase is equivalent to obtaining a better estimate of frequency. The computer simulation results in reduction of $\Delta f$ to $0.0003/T$.

The estimated value of $\Delta_b$ is applied to phase tracking block 330 of FIG. 3 to aid in tracking signal phase. The initial MSK carrier phase estimate is $\hat{\theta}_0$, which is the phase estimate of word 0 computed above in conjunction with the estimation of phase change. This phase estimate is refined as described below in conjunction with FIG. 4 using the start-of-message and a second-order phase tracking loop. During tracking, the estimate of signal phase is incremented (positive or negative) by $\Delta_b$ per bit. Since $\Delta_b$ has an accuracy which may be 0.1° per bit, the MSK carrier signal phase being acquired and tracked changes by at most 0.1° per bit. Such a small uncompensated rate of phase change will allow the loop bandwidth to be reduced to achieve a good phase estimation performance at low SNRs typical of FEC-coded systems.

The estimated phase change per bit ($\Delta_b$) and the estimated phase of word 0 $\hat{\theta}_0$ are passed from the phase change estimation block 324 over data path 329 to the phase tracking block 330 of FIG. 3.

Figure 4:
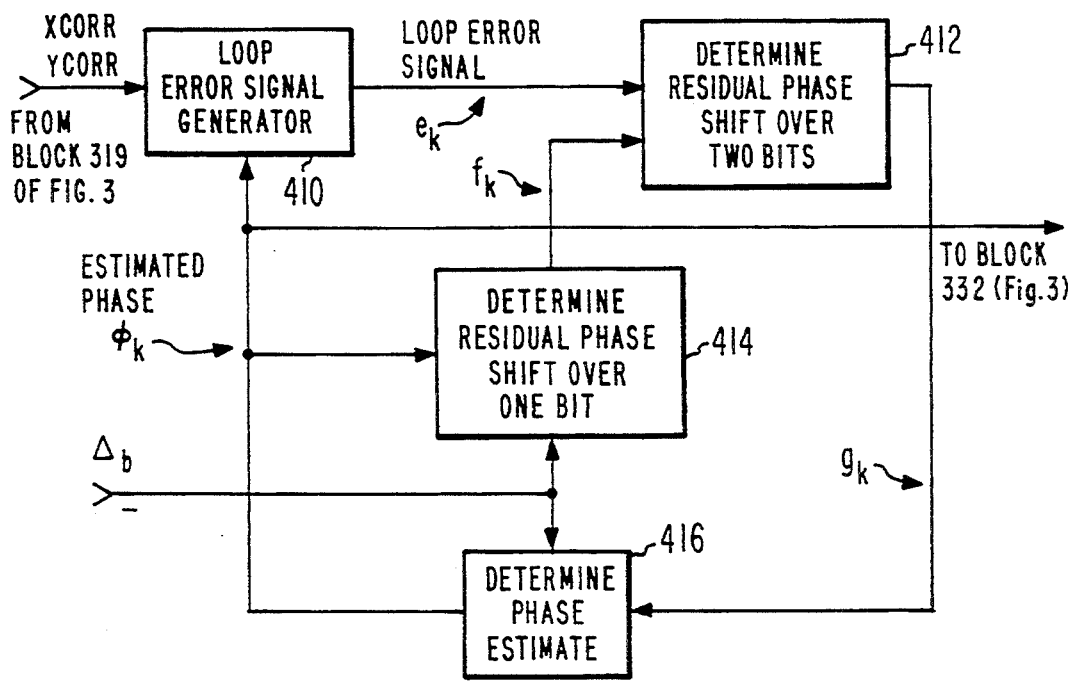
FIG. 4 is a simplified block diagram illustrating the scheme of a second-order tracking-loop included in the receiver of FIG. 3.

FIG. 4 is a simplified block diagram of a phase tracking loop in accordance with the invention, which is the phase tracking block 330 of FIG. 3. In FIG. 4, the XCORR and YCORR values calculated by and stored in the symbol correlation block 319 are applied to an error signal generator 410 together with the estimated signal phase $\phi_k$ of the current bit. Initially, only the start-of-message data is used to acquire carrier phase. Block 410 uses previously determined values of XCORR and YCORR to compute signals $r_c$ and $r_s$, which are related to the sine and cosine, respectively, of the phase error $\Delta\theta$. When the bit count is even $$r_c = XCORR \cos\phi_k + YCORR \sin\phi_k \; r_s = YCORR \cos\phi_k - XCORR \sin\phi_k \quad (12)$$

and when the bit count is odd, $$r_c = -YCORR \cos\phi_k + XCORR \sin\phi_k$$
$$r_s = = XCORR \cos\phi_k - YCORR \sin\phi_k \quad (13)$$

where $\phi_k$ is the current estimated carrier phase. The bit count starts with 0 for the first bit of the SOM.

The effects of preamble modulation are removed by multiplying $r_c$ and $r_s$ by $m_k$, the polarity of the $k^{th}$ MSK pulse, which is either +1 or −1.

$$r'_c = m_k r_c \; r'_s = m_k r_s \quad (14)$$

so that $r'_c$ are $r'_s$ are proportional to the cosine and sine, respectively, of the phase error of the unmodulated MSK carrier.

A new estimate e of the phase error is made $$e = \tan^{-1}(r'_s/r'_c) - \gamma \quad (15)$$

where $\gamma$ is a bias attributable to unequal polarities of the bits, $b_{k-1}$ and $b_{k+1}$, which are next adjacent to the current bit $b_k$. The value of $\gamma=0$ if $b_{k-1}=b_{k+1}$, and $\gamma \sim 0.57\ b_{k-1}b_k$ otherwise, because $\tan^{-1}(2/\pi)=0.57$ radians. The value of the bias term $\gamma$ can be derived by noting that when $r'_c$ is normalized to unity (one), and if the phase error is zero, $r'_s$ equals $2/\pi$ if the current bit $b_k$ equals the previous bit $b_{k-1}$, and $r_s'$ equals $-2/\pi$ otherwise.

The error signal e produced by block 410 of FIG. 4 is limited in magnitude to form $e_k$, the loop error signal $$e_k = \begin{matrix} \lambda \text{ if } e > \lambda \\ e \text{ if } -\lambda \leq e \leq \lambda \\ -\lambda \text{ if } e < -\lambda \end{matrix} \quad (16)$$

where limiting value X is expressed in radians.

Generator 410 of FIG. 4 generates a loop error signal $e_k$ for the $k^{th}$ bit as described above. The error signals $e_k$ are applied from generator 410 to a block 412, together with $f_k$, the residual phase change over one bit. Block 412 determines the values of $g_k$, the residual phase shift over two bits, $$g_k = 2f_{k-1} + \beta_1 e_{k-1} + \beta_2 e_{k-2} \quad (17)$$

where $f_{k-1}$ is a stored value of $f_k$ from a previous loop traversal, and where $\beta_1$ and $\beta_2$ are loop parameters related to a parameter $\beta$ by $$\beta_1 = 2(1-e^{-\beta}\cos\beta)\ \beta_2 = e^{-2\beta} - 1 \quad (18)$$

The residual phase change over two bits ($g_k$), which is produced by block 412 of FIG. 4, is applied to a block 416. Block 416 determines the current bit phase estimate $\phi_k$ as the sum of the phase estimate $\phi_{k-2}$ previously determined for the $2^{nd}$ prior bit, plus twice the previously determined phase drift or phase change $\Delta b$ over one bit, plus the residual phase shift over two bits ($g_k$)

$$\phi_k = \phi_{k-2} + 2\Delta_b + g_k \quad (19)$$

The value of $\phi_k$ is applied back to error signal generator 410 for processing as described above in conjunction with block 410, and is also applied to a block 414. Block 414 determines $f_k$, the residual phase shift over one bit, according to $$f_k = \phi_k - \phi_{k-1} - \Delta_b \quad (20)$$

which is the difference between the phase of the current bit and the prior bit, from which is subtracted the previously determined phase change or phase drift per bit $\Delta_b$.

The loop of FIG. 4 generates estimated phase signals $\phi_k$ from the bits of the start-of-message portion of the preamble. Phase acquisition begins at bit count 3 of the start-of-message portion of the preamble, because the processing requires knowledge of the phase of the $2^{nd}$ preceding, preceding, and following bits, relative to the current bit. Phase acquisition ends at bit count 202 of the SOM, which is the last bit for which the value is known a priori.

The second-order digital loop of FIG. 4 has an impulse response similar to that of an analog loop with a damping factor 1/2. the noise bandwidth $B_L$ of the loop is, for $B<<1$, $B_L \sim 3\beta/2$.

The loop of FIG. 4 is initially set with the values $\phi_3 = \phi_0$; $\phi_2 = \phi_0 - \Delta_b$; $e_3 = 0$; $e_2 = 0$, where $\phi_0$ is the estimate of the phase of word 0, described in conjunction with equations 9 and 10. Simulations have indicated that the value of parameter $\beta$ for use in the loop of FIG. 4 should be near $\beta = 0.02$, but that the bit error rate (BER) changes by only small amounts when B is /2 larger or smaller than 0.02. A value of $\beta = 0.01$ resulted in a 2 dB degradation in BER at $E_b/N_0 = 6$ dB.

The loop of FIG. 4 used to acquire the signal phase from the preamble is also used for phase tracking during the information data portion of the message. The advantage of using the same tracking loop is that the loop has already reached steady-state operation before data demodulation begins. Starting from bit count 203 after the start-of-message portion of the preamble, the transmitted bits are not known a priori.

Consequently, decision-directed tracking is employed in blocks 330 and 332 of FIG. 3, in conjunction with the loop of FIG. 4. The decision-directed tracking is identical to the tracking described above with the exception that $b_{k-1}$, $b_k$ and $b_{k+1}$ are demodulated bit values instead of known bit values. A decision must be made whether an information data bit is 1 or $-1$. The bit decisions are performed by coherent MSK demodulation block 332. When the bit count k, starting from the beginning of the start-of-message portion of the preamble, is even, the value $r_k$, representing the matched filter output with the signal phase removed, is determined $$r_k = \text{XCORR}\cos\psi_k + \text{YCORR}\sin\psi_k \quad (21)$$

when bit count k is odd $$r_k = \text{YCORR}\cos\psi_k + \text{XCORR}\sin\psi_k \quad (22)$$

where $\psi_k$ is the phase estimate provided by phase estimation block 330. The coherent MSK demodulation block 330 sets $Z_k = r_k$ for (k mod 4) = 0, or 1 $Z_k = -r_k$ for (k mod 4) = 2, or 3.

The decision rule for bit modulation or polarity $b_k$ is $$b_k = \begin{matrix} 1 \text{ if } Z_k > 0 \\ -1 \text{ otherwise} \end{matrix} \quad (23)$$

An initial bit decision for the next following bit, $b_{k+1}$, is made by using $\phi_k + \Delta_b$ in place of $\phi_k$ in equations 21 and 22, and the initial bit decision is redetermined when the new phase estimate is available.

During reception of a burst, the storage of the preamble, and multiple readouts for processing, might appear to cause a considerable delay, which might prevent acquisition of an immediately following burst. However, bit/word sync processing can begin almost immediately after the beginning of reception, and need not wait for reception and storage of the data portion of the MSK burst, nor even for completion of the reception and storage of the preamble. The carrier phase can be acquired before reception of the message portion of the burst is completed. Demodulation can therefore begin on the earlier-received portions of the message data before reception of the message portion is completed. The demodulation rate is not limited by the rate of data reception, but by the processor speed, which is likely to be much greater. The demodulation can therefore "catch up" with the data, and demodulation may be completed essentially concurrently with the end of the message data.

Other embodiments of the invention will be apparent to those skilled in the art. For example, other sequences can be used in place of the Barker sequences described. Factors affecting the choice may include the sidelobe levels of the sequence selected; the coherent integration time, with longer sequences having a longer integration time and therefore requiring a better frequency estimate; the processing capability of the receiver hardware, and the like. Also, while the preamble has been illustrated and described as preceding the information data, it may be within or follow the information data, since the entire sequence of information and preamble is stored and may be processed in any order when retrieved from memory. For similar reasons, the bit/word sync portion of the preamble may follow the message sync portion. An alternative technique for processing the continuous-wave portion of the preamble for frequency acquisition is to couple data path 312 to frequency acquisition block 320 to couple the analog signal thereto.

What is claimed is:

1. A method for demodulating a downconverted carrier signal MSK-modulated with a recurrent sequence of digital data words, each of which sequences is accompanied by a preamble, said preamble including a sequence of mutually identical bit/word sync words and a sequence of words together constituting message sync, where each of said words includes a plurality of bits, and said bits of said bit/word sync words are selected for low autocorrelation, said method comprising the steps of:

converting said downconverted carrier signal into digital form at a sample rate which produces at least two samples per bit, to form received digital signals;

storing in memory said received digital signals representing at least one of said sequences and its accompanying preamble to form stored received signals;

reading from memory for a first time at least said bit/word sync words and said message sync words of said stored received signals to produce first-read received signals;

correlating said first-read received signals with stored information relating to said preamble to produce information relating to bit and word timing;

reading from memory for a second time at least one of said sequences of bit/word sync words and said sequences of message sync words of said stored received signals, to produce second-read signals;

correlating said second-read signals with stored information relating to said preamble using said bit and word timing information to start said correlation, to produce information relating to the timing of said sequences of message sync words;

determining the timing of said preamble from said information relating to the timing of said sequences of message sync words and the known durations of other portions of said preamble;

reading from memory for a third time at least a portion of said preamble from said stored received signals, to produce third-read signals;

correlating said third-read signals with stored information relating to MSK symbol characteristics, to thereby produce symbol correlations;

storing said symbol correlations in memory to produce stored symbol correlations;

reading from memory for a first time at least some of said stored symbol correlations to produce first-read symbol correlations;

determining the phase of said first-read symbol correlations in each word, taking the difference in phase between a particular bit of each word and the corresponding particular bit of the following word to produce one-word phase differences, averaging said one-word phase differences over at least a portion of said preamble to produce an estimated phase change per word, and dividing said estimated phase change per word by the number of bits per word to produce estimated phase change per bit;

reading from memory for a second time at least some of said stored symbol correlations to produce second-read symbol correlations;

using said second-read symbol correlations and said estimated phase change per bit to produce an estimate of the carrier phase of the first bit of said sequence of digital data words; and using said estimate of the carder phase of the first bit of said sequence of digital data words and said estimated phase change per bit to aid said demodulator carrier phase to progress during demodulation of said sequence of digital data words.

2. A method for wireless communication of digital information, comprising the steps of:

breaking said digital information into discrete segments to form digital information segments;

generating a preamble comprising a start-of-message portion, said start-of-message portion of said preamble including a bit/word synchronization portion and a message synchronization portion, said bit/word synchronization portion including a repetitive sequence of bit/word sync words, and said message synchronization portion including a plurality of words;

adding said preamble to each of said digital information segments, to form transmissible signal packets;

MSK modulating each of said transmissible signal packets onto a carrier, to produce a baseband modulated signal;

upconverting said baseband modulated signal to a higher transmission frequency to produce an upconverted signal;

transmitting said upconverted signal to produce transmitted signal;

receiving said transmitted signal to produce an analog received signal including modulation in the form of MSK symbols;

downconverting said analog received signal by multiplying said analog received signal by a local oscillator signal, to produce in-phase (I) and quadrature-phase (Q) received signals representative of a downconverted received carrier signal which includes modulation, and which may also include unwanted phase modulation which might result in bit errors;

sampling said I and Q received signals at a sampling rate which defines a plurality of samples during each of said MSK symbols of said downconverted received signal to produce I and Q analog samples;

analog-to-digital converting said I and Q analog samples to produce I and Q digital samples;

storing said I and Q digital samples to produce stored I and Q digital samples;

determining bit/word timing by repeatedly correlating said stored I and Q samples with a replica of said bit/word synchronization portion of said preamble, advancing the correlation window by a pair of said stored I and Q digital samples at each repetition until a correlation peak is detected, to thereby produce bit/word timing information;

determining the starting time of said message synchronization portion by correlating said stored I and Q digital samples with a replica of said message synchronization portion, by starting said correlation at a word boundary identified by said bit/word timing information, and repeating said correlation repeatedly by advancing the correlation window by one word at each repetition until a correlation peak is detected, to thereby produce said starting time of said message sync portion;

determining the starting time of said start-of-message portion of said preamble by summing the duration of one of (a) said bit/word synchronization portion and (b) said message synchronization portion with the starting time of the other one of said (a) message synchronization portion and (b) said bit/word synchronization portion, respectively;

determining in-phase (XCORR) and quadrature (YCORR) symbol correlations by repeatedly correlating said stored I and Q digital samples with a stored template of the MSK pulse (Si), said symbol correlations starting at said starting time of said start-of-message portion of said preamble, said correlations lasting over the duration of an MSK pulse, advancing the correlation window by one bit of said preamble at each repetition to produce N pairs of XCORR and YCORR values where N is the number of bits in said start-of-message portion of said preamble and said digital information segment;

determining unadjusted in-phase word correlations ($Z_c$) for each word of said start-of-message portion of said preamble, by (a) summing the products of XCORR multiplied by the MSK pulse polarity for the even-number bits within said word, where the bit numbers begin with zero, and (b) subtracting from the resulting sum the sum of the products of YCORR multiplied by the MSK pulse polarity for the odd-numbered bits within said word;

determining unadjusted quadrature word correlations ($Z_a$) for each word of said start-of-message portion of said preamble, by (a) summing the products of YCORR multiplied by the MSK pulse polarity for the odd-numbered bits within said word, and (b) adding to the resulting sum the sum of the products of XCORR multiplied by the MSK pulse polarity for the odd-numbered bits of said word;

determining in-phase and quadrature word correlations ($R_c$ and $R_s$) for each word in said preamble to account for integer multiple of 90° phase shift of MSK modulation, said $R_c$ and $R_s$ correlations being related to said unadjusted in-phase and quadrature word correlations $Z_c$ and $Z_s$ according to the relationships $R_c = Z_c$, $-Z_s$, $-Z_c$ or $Z_s$, and $R_s = Z_s$, $Z_c$, if the number of bits from the beginning of said preamble to the beginning of said word, not counting the bits in said word, modulo-4 is equal to 0, 1, 2 and 3, respectively;

determining phase change per bit of said downconverted received signal by (a) for each of said words of preamble, taking the ratio of the amplitude of said $R_s$ correlation to the amplitude of said $R_c$ correlation to produce an arctangent ratio signal, (b) for each of said words, determining the phase of said downconverted received signal represented by said arctangent signal, (c) taking the difference between said phase of each word and said phase of the next following word, to determine the one-word phase differences over at least a portion of said preamble, and (d) averaging said one-word phase differences over said portion of said preamble to establish the estimated rate of phase change per word; (e) dividing said estimated rate of phase change per word by the number of bits per said word to obtain said estimated phase change per bit ($\Delta_b$);

generating an estimated signal phase of said downconverted signal with its modulation at the start of a digital information segment associated with the current preamble, by iteratively:

(A) odd- and even-processing said XCORR and YCORR symbol correlations to produce loop error signals ($e_k$) said odd- and even-processing of said XCORR and YCORR symbol correlations including the steps of (a) when a bit count is even, where said bit count begins with zero for the first bit of said start-of-message portion of said preamble, forming a cosine term (rc) of a phase error between said phase of said downconverted signal and an estimated signal phase by summing (i) the product of multiplying said XCORR symbol correlation by the cosine of the estimated signal phase, with (ii) the product of multiplying said YCORR symbol correlation by the sine of said estimated signal phase, and of forming a sine term (rs) of said phase error by taking the difference between (i) the product of multiplying said YCORR symbol correlation by the cosine of said estimated signal phase, and (ii) the product of multiplying said XCORR symbol correlation by the sine of said estimated signal phase, (b) when said bit count is odd, of forming a cosine term ($r_c$) of said phase error, by taking the difference between (i) the product of multiplying said XCORR symbol correlation by the sine of said estimated signal phase, and (ii) the product of multiplying said YCORR symbol correlation by the cosine of said estimated signal phase, and of forming a sine term (rs) of said phase error by summing (i) the product of multiplying said XCORR symbol correlation by the cosine of said estimated signal phase, with (ii) the product of multiplying said YCORR symbol correlation by the sine of said estimated signal phase, said sine and cosine terms $r_c$ and $r_s$ being proportional to the product of the modulation and the sine and cosine, respectively, of said phase error; (c) for removing the effects of at least one of the preamble and data modulation from an estimated carrier phase, when the current bit is in the preamble, multiplying said sine ($r_s$) and cosine terms ($r_c$) by a modulation phase signal ($m_k = +1, -1$) of the respective known bit of said preamble and, when the current bit is in the digital information segment, multiplying said sine ($r_s$) and cosine ($r_c$) terms by the modulation phase signal ($m_k = +1, -1$) of the demodulated bit to thereby generate modulation-compensated sine ($r_s'$) and cosine ($r_c'$) terms proportional to the unmodulated sine and cosine terms of said phase error, (d) determining an uncorrected new estimate of said phase error by taking the arctangent of the ratio of said modulation-compensated sine term divided by said modulation-compensated cosine term, which uncorrected new estimate of said phase error may have a bias responsive to the modulation of adjacent bits, when the bit preceding the bit being processed and the succeeding bit are unequal; (e) determining a corrected new estimate of said phase error in each bit of said start-of-message portion of preamble by, when the bits preceding and following the current bit are unequal, subtracting from said uncorrected new phase error a quantity equal to the product of a bias constant ($\sim 0.57$ rad) multiplied by a modulation product, wherein said modulation product is the product of the modulation of the current bit and the modulation of the previous bit, to thereby produce said corrected new estimate of said phase error, and by, when said bit preceding and following said current bit are equal, using said uncorrected new estimate of said phase error as said corrected new estimate of said phase error, and (f) limiting the values of said corrected new estimate of said phase error to less than $\pi$ to form said loop error signals ($e_k$); and (B) second-order processing said loop error signals by means of a second order tracking loop to produce said estimated signal phase ($\phi_k$) for the current bit (bit count k), said second order tracking loop producing said estimated signal phase including the steps of (a) determining the residual phase shift over one bit ($f_{k-1}$) for the preceding bit by taking the difference between the estimated signal phases ($\phi_{k-1}$ and $\phi_{k-2}$) of the two bits (bit counts k-1 and k-2) preceding the current bit (bit count k), and subtracting from said difference said estimated phase change per bit; (b) determining the residual phase shift over two bits ($g_k$) for the current bit by summing (i) two times said residual phase shift over one bit ($f_{k-1}$) for the preceding bit, (ii) the product of a first loop constant $\beta_1$ multiplied by said loop error signal ($e_{k-1}$) for the preceding bit, and (iii) the product of a second loop constant $\beta_2$ multiplied by said loop error signal ($e_{k-2}$) for bit count k-2; and (c) determining said estimated phase for the current bit (bit count k) by summing (i) the estimated phase ($\phi_{k-2}$) for bit count k-2, (ii) two times said phase change per bit, and (iii) said residual phase shift over two bits ($g_k$) for the current bit; and demodulating said downconverted signal with the aid of said estimated signal phase ($\phi_k$) for the current bit (bit count k) to produce (i) said demodulated bit for said current bit (count k); (ii) said demodulated bit for the next following bit (count k+1) by using $\phi_k + \Delta_b$ as said estimated phase for said next following bit (count k+1); (iii) said demodulated bit for the second following bit (count k+2) by using $\phi_k + 2\Delta_b$ as said estimated phase for said second following bit (count k+2).

3. A method according to claim 1, wherein said bit/word synchronization portion of said preamble precedes said message sync portion.

4. A method according to claim 2, wherein said step of determining bit/word timing precedes said step of determining the starting time of said message sync portion.

5. A method according to claim 2, wherein
said bit/word sync portion of said preamble precedes said message sync portion; and wherein
in said step of determining the starting time of said preamble, said summing step includes the step of subtracting said duration of said bit/word sync portion from said starting time of said message sync portion.

6. A method according to claim 2, wherein said step of determining the starting time of said message sync follows said step of determining bit timing.

7. A method according to claim 2, wherein said step of determining the starting time of said preamble follows said step of determining the starting time of said message sync.

8. A method according to claim 2, wherein said step of breaking said digital information into segments includes the step of:
encoding said segmented information using error correction codes to form encoded digital information segments.

9. A method according to claim 2, wherein said step of generating a preamble includes the step of selecting the sequence of bits in each of said sync words for low autocorrelation and selecting words for an unbiased estimate of phase change per bit.

10. A method according to claim 2, wherein said bit/word sync is made up of 20 copies of a 7-bit Barker sequence $A_o = 111\text{-}1\text{-}11\text{-}1$ and said words of the message sync are selected from among cyclic shifts of the 7-bit Barker sequence $A_4$, $A_2$, $A_5$, $A_3$, $A_5, A_2$, $A_4$, $A_0$, $A_0$, where $A_i$ is $A_0$ cyclically shifted to the left by i bits.

11. A method according to claim 2, wherein said bias constant is approximately equal to $0.57$ radians.

12. A method according to claim 2, wherein said second-order processing begins with bit count 4, with initial conditions $\phi_3 = \theta_0$, $\phi_2 = \theta_0 - \Delta_b$, $e_3 = 0$, $e_2 = 0$, where $\theta_0$ is the phase estimate of word 0 of said preamble and $\Delta_b$ is said estimated phase change per bit.

* * * * *